US012481342B2

(12) United States Patent
Montero et al.

(10) Patent No.: US 12,481,342 B2
(45) Date of Patent: Nov. 25, 2025

(54) DIAGNOSING POWER STATE TRANSITION FAILURES IN A HETEROGENEOUS COMPUTING PLATFORM

(71) Applicant: Dell Products L.P., Round Rock, TX (US)

(72) Inventors: Adolfo S. Montero, Pflugerville, TX (US); Amit K. Tiwari, Austin, TX (US); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 18/626,767

(22) Filed: Apr. 4, 2024

(65) Prior Publication Data

US 2025/0315091 A1    Oct. 9, 2025

(51) Int. Cl.
*G06F 1/32* (2019.01)
*G06F 1/3206* (2019.01)

(52) U.S. Cl.
CPC ................ *G06F 1/3206* (2013.01)

(58) Field of Classification Search
CPC ..................................... G06F 1/3206
See application file for complete search history.

(56) References Cited

U.S. PATENT DOCUMENTS

| 5,471,625 | A  | * | 11/1995 | Mussemann | G06F 1/3203 713/323 |
| 9,229,522 | B1 | * | 1/2016 | Tian | G06F 11/3062 |
| 2014/0173298 | A1 | * | 6/2014 | Bircher | G06F 1/3203 713/300 |

* cited by examiner

*Primary Examiner* — Stefan Stoynov
(74) *Attorney, Agent, or Firm* — Fogarty LLP

(57) ABSTRACT

Systems and methods include an Information Handling System (IHS) that is adapted to address power state transition failures by an IHS. An Embedded Controller (EC) of the IHS detects a request for the IHS to transition to a low-power operating state, such as a modern standby power state. The EC monitors for progress of the IHS in transitioning to the low-power operating state. Based on the monitoring, the EC determines the SoC is preventing the transition by the IHS to the low-power operating state. The EC identifies and releases hardware resources of the IHS that are referenced by the SoC and that are preventing the transition of the IHS to the low-power operating state.

20 Claims, 6 Drawing Sheets

DIAGNOSING POWER STATE TRANSITION FAILURES IN A HETEROGENEOUS COMPUTING PLATFORM

FIELD

This disclosure relates generally to Information Handling Systems (IHSs), and more specifically, to systems and methods for managing power state transitions by IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Portable IHSs (e.g., laptops, tablets, smartphones, etc.) have increased in popularity due to the convenience and versatility they bring to users. Portable IHSs utilize rechargeable batteries, with the IHS drawing power from the batteries when not coupled to an external power source. In order to conserve power that is stored in these rechargeable batteries, IHSs may implement various low-power modes. Inability to satisfy all of the conditions required to transition to a particular low-power mode prevents the IHS from gracefully transitioning to the low-power mode and thus prevents the IHS form achieving attainable power savings.

SUMMARY

In various embodiments, Information Handling Systems (IHSs) may include: an SoC (System on Chip); one or more processors and a memory comprising program instructions that, upon execution by the processors, run an operating system of the IHS: an Embedded Controller (EC) and a memory comprising program instructions that, upon execution by the EC, cause the EC to: detect a request for the IHS to transition to a low-power operating state; monitor progress of the IHS in transitioning to the low-power operating state; determine the SoC is preventing the transition by the IHS to the low-power operating state; and identify and release hardware resources of the IHS referenced by the SoC in preventing the transition of the IHS to the low-power operating state.

In some embodiments, the low-power operating state of the IHS comprises a modern standby operating state. In some embodiments, the request for the IHS to transition to a low-power operating state comprises a user input to the IHS that is detected by the EC. In some embodiments, the user input to the IHS detected by the EC comprises an input to the operating system of the IHS. In some embodiments, the user input to the IHS detected by the EC comprises a user pressing one or more buttons or keys of the IHS. In some embodiments, the monitoring of progress of the IHS in transitioning to the low-power operating state comprises the EC monitoring the transition of a plurality of hardware components of the IHS to respective low-power operating states. In some embodiments, the EC determines the SoC is preventing the transition by the IHS to the low-power operating based on the EC not detecting a transition of the SoC to a low power operating state. In some embodiments, in response to the EC not detecting a transition of the SoC to a low power operating state, the EC identifies one or more hardware drivers being run by the SoC, wherein the running hardware drivers prevent the transition of the SoC to a low power operating state. In some embodiments, the EC identifies a hardware component of the IHS that is operated by the one or more running hardware drivers. In some embodiments, the EC interfaces with the hardware component operated by the one or more running hardware drivers to identify active sessions with the SoC. In some embodiments, the hardware resources of the IHS referenced by the SoC that prevent the transition of the IHS to the low-power operating state comprise the hardware component operated by the one or more running hardware drivers. In some embodiments, the release of the hardware resources comprises the EC terminating the one or more hardware drivers run by the SoC.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc., which typically include ARM core(s).

Figure 1:
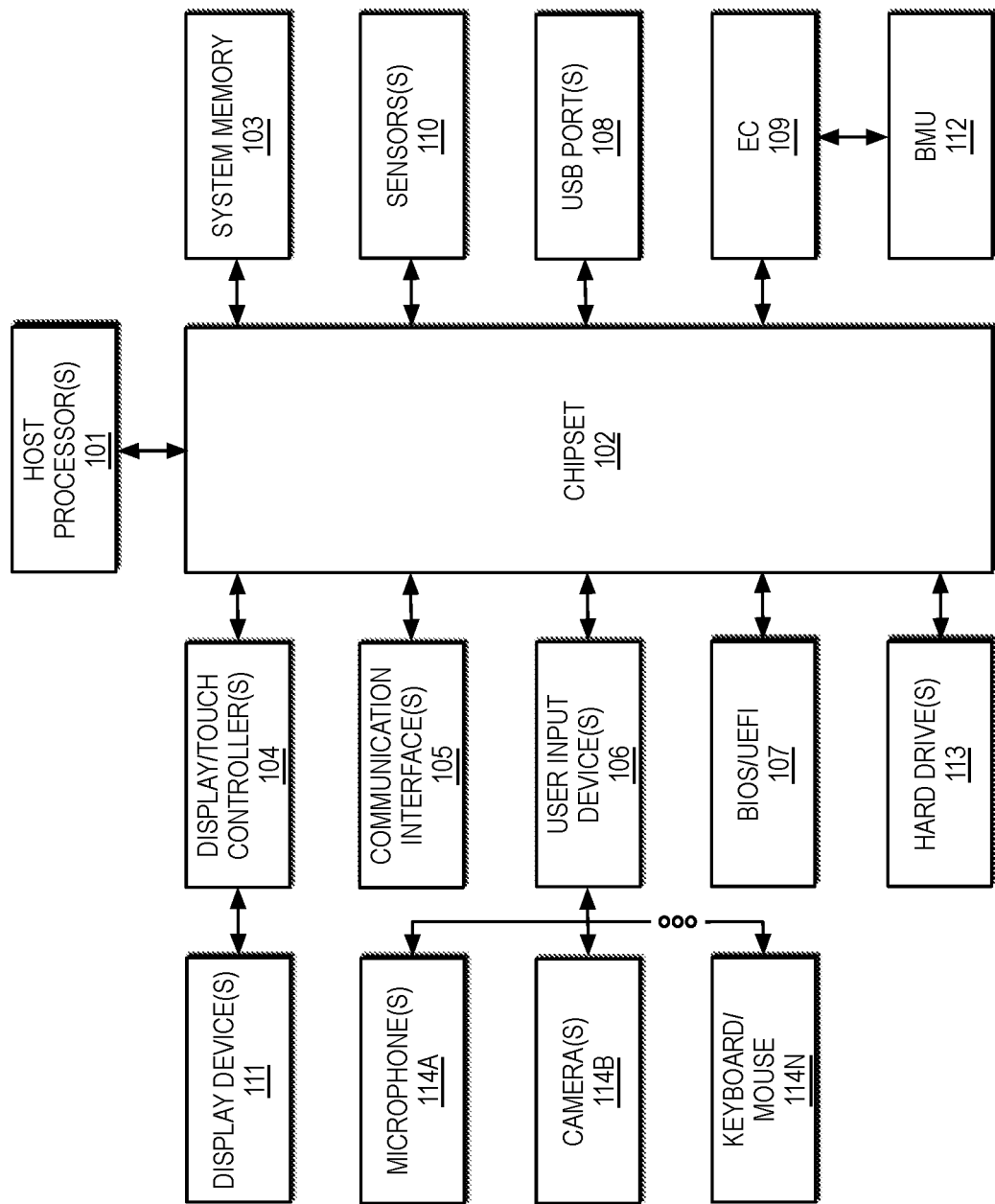
FIG. 1 is a diagram illustrating examples of components of an Information Handling System (IHS) that is configured, according to some embodiments, for diagnosing power state transition failures by the IHS.

FIG. 1 is a block diagram of components of an IHS (Information Handling System) 100 that, in some embodiments, may include a heterogenous computing platform, as described in additional detail below, and that is configured to diagnose power state transition failures, in particular transition failures resulting failure to satisfy transition conditions of SoCs of the IHS. As depicted, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more or Graphics Processor Units (GPUs) on a graphics bus, such as an Accelerated Graphics Port (AGP) or PCIe bus. As shown, display controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS) 107 is coupled to chipset 102. Unified Extensible Firmware Interface (UEFI) was designed as a successor to BIOS, and many modern IHSs utilize UEFI in addition to or instead of a BIOS. Accordingly, the term "BIOS" is also intended to also encompass a UEFI component. In operation, BIOS 107 provides an abstraction layer that allows the OS to interface with certain hardware components that are utilized by IHS 100.

Upon booting of IHS 100, host processor(s) 101 may utilize program instructions of BIOS 107 to initialize and test hardware components coupled to IHS 100, and to load host OS 300 for use by IHS 100. Via the hardware abstraction layer provided by BIOS 107, software stored in system memory 103 and executed by host processor(s) 101 can interface with certain I/O devices that are coupled to IHS 100.

Embedded Controller (EC) 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostics, and remediation over an OOB or sideband network, etc. Moreover, in various implementations, EC 109 may be configured to perform operations for diagnosing power state transition failures by the IHS 100, as described in more detail below.

Unlike other devices in IHS 100, EC 109 may be operational from IHS being powered, in particular before other devices are fully running or even powered. As such, EC 109 firmware may be responsible for interfacing with a power adapter to manage the various power states that may be supported by IHS 100. Power operations of the EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

From the perspective of users, IHS 100 may appear to be either "on" or "off," without any other detectable power states. In some embodiments, however, an IHS 100 may support multiple power states that may correspond to the states defined in the Advanced Configuration and Power Interface (ACPI) specification, such as: S0, S1, S2, S3, S4, S5, and G3. For example, when an IHS 100 is operating in S0 working mode, the IHS is operational, but some hardware components that are not in use may still be individually configured in low power states. In an S0 low-power, idle mode ("Sleep" or "Modern Standby"), an IHS 100 remains partially running with various capabilities of the IHS (e.g., displays, network controllers) may be powered down and other capabilities (e.g., EC, processors) may be in low-power standby modes, thus supporting the ability of the IHS to quickly transition from to a full-power, working S0 mode in response to various events. In the past, S3 was commonly used as a default "Sleep state." However, many IHSs 100 utilize the described Modern Standby, which may be designated as a hybrid "S0ix" mode, where some or all of the internal hardware of IHS 100 may be placed into their lowest power state, while still supporting code execution that allows a fast response and transition of the IHS to a working S0 mode.

An IHS 100 may additionally or alternatively support other low-power modes, such as S1-S3 (that may also be referred to as "Sleep" modes), where the IHS may appear to users to be in an off state. Some IHSs may support only one or two of these states, where the number of distinct states may be a reflection of power saving features of the IHS that have been selected for use. For instance, the amount of power consumed in states S1-S3 is less than S0 and more than S4. An S3 mode consumes less power than S2, and S2 consumes less power than S1. In states S1-S3, volatile memory may be periodically refreshed in order to maintain the operating state of the IHS, with some components remaining powered so that the IHS may wake based on inputs from a keyboard, Local Area Network (LAN), or a Universal Serial Bus (USB) device.

In the S4 state ("Hibernate"), power consumption is reduced to its lowest level. The IHS saves the contents of volatile memory to a hibernation file and some components remain powered, allowing the IHS to wake based on detected input from the keyboard, LAN, or a USB device. "Hybrid sleep" may implemented by some IHSs may use a hibernation file that is used to save the IHS's operating state, and also used to resume the IHSs operations upon reverting to a working S0 mode. "Fast startup" may refer to a power state where the user is logged off before the hibernation file is created, which allows for a smaller hibernation file in IHSs with reduced storage capabilities.

When in the S5 state ("Soft off" or "Full Shutdown"), an IHS 100 is fully shut down without a hibernation file. It occurs when a restart is requested or when an application invokes a shutdown command of the OS, EC 109, etc. During a full shutdown and re-boot, the user session is methodically de-constructed and restarted on the next boot. In some instances, a boot/startup from an S5 state takes significantly longer than resuming from S1-S4 states. At the hardware level, the main difference between S4 and S5 may be that S4 sets a flag on the storage device used to store the hibernation file and configures the bootloader to boot from the flagged hibernation file instead of booting the OS from scratch.

In a G3 ("Mechanical off") power mode, the IHS 100 may be completely turned off and consumes absolutely no power from its Power Supply Unit (PSU) or main battery (e.g., a lithium-ion battery), with the exception of any Real-Time Clock (RTC) batteries (e.g., Complementary Metal Oxide Semiconductor or "CMOS" batteries, Basic Input/Output System or "BIOS" batteries, coin cell batteries, etc.), which are used to provide power for the IHS's internal clock/calendar and for maintaining certain configuration settings. In some instances, G3 represents the lowest possible power configuration of an IHS from which the IHS can be initialized. From a G3 mode, an IHS may transition to an S5 mode in response to AC power source coupling (i.e., transitioning between battery mode to AC mode). Additionally, or alternatively, an IHS may transition from G3 to S0 based upon the detection of a power button event.

As described in additional below, embodiments may diagnose failures to complete a transition by an IHS 100 to a lower power state. Various requirements may be placed on transitions by an IHS and/or by individual hardware to lower power operating states. In some scenarios, an IHS 100 may be prevented from completing a transition to a lower power operating state due to a single hardware component that is unable to transition to a lower power setting. In some scenarios, an SoC that is used in implementing a heterogenous computing platform 200 may be unable to a complete a power state transition due to inability to properly release all hardware device references, such as to deactivate drivers used by the SoC to interface with hardware of an IHS 100. In some scenarios, drivers that require deactivation prior to transitioning an SoC to a lower power operating state may become nonresponsive, thus preventing a graceful transition to a lower power setting. In some scenarios, an SoC may be prevented from completing a transition to a lower power operating state due to a missing driver, such as a low-power driver that is loaded for operation of the device by the SoC in a low power state.

In all such scenarios, abrupt termination of the driver process may result in loss of information or an error state by a hardware component and/or by the SoC that is running the hardware device driver. As described in more detail below, in various embodiments, EC 109 may implement operations for diagnosing hardware component issues that are preventing an IHS 100 from transitioning to a lower power operating state, in particular for diagnosing unmet requirements by SoCs resulting in the SoC being unable to transition to a lower power operating state.

EC 109 firmware may also implement operations for detecting certain changes to the physical configuration or posture of IHS 100 (such as a laptop computer), and may also manage operations of other IHS devices based on the current physical configuration of IHS 100. For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, the EC 109 may enable or disable certain features of IHS 100 (e.g., front or rear facing camera, etc.).

In this manner, EC 109 may identify any number of IHS physical postures, including, but not limited to: laptop, stand, tablet, or book. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

In some implementations, EC 109 may be installed as a Trusted Execution Environment (TEE) component to the motherboard of IHS 100. Accordingly, as a component with the root of trusted hardware of IHS 100, EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based on instructions and settings loaded for use by a hardware component of IHS 100 and may compare the calculated value against the reference hash value to determine if any modifications have been made to the component, thus indicating that the component has been compromised. As such, EC 109 may validate the integrity of hardware and software components installed in IHS 100.

In some embodiments, EC 109 may provide an OOB (Out-Of-Band) or sideband channel that allows an ITDM or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted. In some embodiments, these OOB channels supported by the EC 109 may include a sideband management connection, such as an I2C management bus, allowing direct communication with an SoC of the IHS, such as an SoC used to implement a heterogenous computing platform 200. As described in additional detail below, this sideband connection may be utilized by the EC 109 in diagnosing power state transition failures by SoCs that are preventing an IHS 100 from transitioning to a lower power operating state.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to other IHS components, such as, for EC 109 and/or other devices within heterogeneous computing platform 200 (FIG. 2).

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), etc.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

Figure 2:
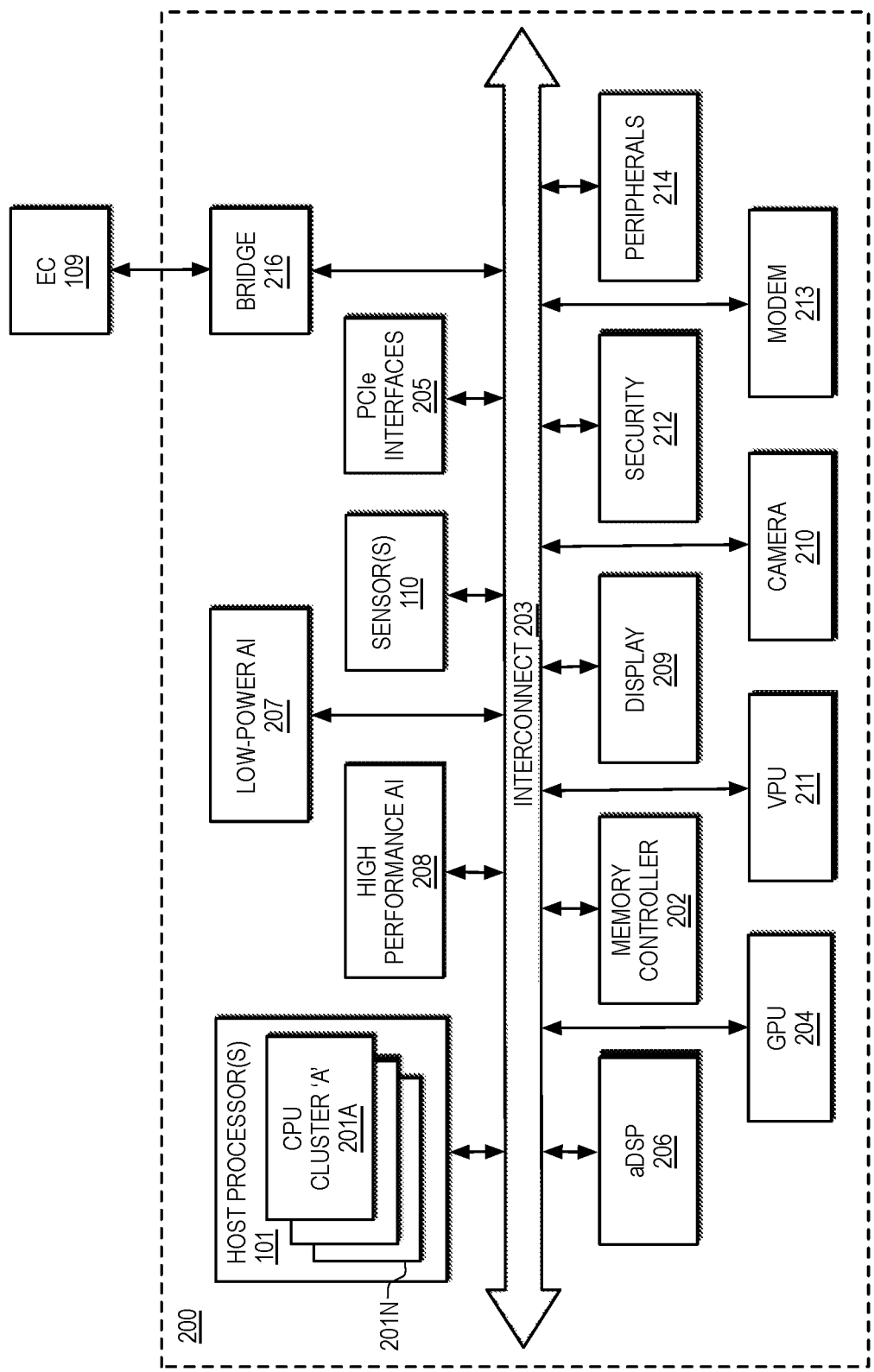
FIG. 2 is a diagram illustrating an example of a heterogenous computing platform configured, according to some embodiments, for diagnosing power state transition failures.

For instance, in various embodiments, host processor(s) 101 and/or other components shown in FIG. 1 (e.g., chipset 102, display controller(s) 104, communication interface(s) 105, EC 109, etc.) may be replaced by devices within heterogenous computing platform 200 (FIG. 2). As such, IHS 100 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, and/or mobile OSs (e.g., ANDROID, IOS, WINDOWS MOBILE, etc.). More recently, however, IHS manufacturers have started producing fully-fledged desktop and laptop IHSs equipped with ARM-based, heterogeneous computing platforms. Accordingly, host OSs (e.g., WINDOWS on ARM) have been developed to provide users with a familiar OS experience on those platforms.

FIG. 2 is a diagram illustrating an example of heterogenous computing platform 200 that may interface with hardware of an IHS 100 and that may maintain references to this hardware, where failure to release these hardware references may prevent transition of the heterogenous computing platform 200 to a low power state. In various embodiments, heterogenous computing platform 200 may be implemented in one or more SoCs, FPGAs, ASICS, or the like. Heterogenous computing platform 200 may include one or more discrete and/or segregated devices or components, each having a different set of processing capabilities suitable for handling a particular type of computational task. When each device in platform 200 is tasked with executing only the types of computational tasks that it is specifically designed to execute, the overall power consumption of heterogenous computing platform 200 is minimized.

In various implementations, some of the devices in heterogenous computing platform 200 may include their own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may be accessible through a respective Application Programming Interface (API). Additionally, or alternatively, some devices in heterogenous computing platform 200 may execute their own OS. Additionally, or alternatively, one or more of the devices of heterogenous computing platform 200 may be virtual devices.

In the embodiment illustrated in FIG. 2, heterogenous computing platform 200 includes CPU clusters 201A-N that may correspond to system processor(s) 101, and that are intended to perform general-purpose computing operations. Each of CPU clusters 201A-N may include one or more processing cores and cache memories. In operation, CPU clusters 201A-N are available and accessible to the IHS's host OS 300 (e.g., WINDOWS on ARM) and other applications executed by IHS 100.

CPU clusters 201A-N may be coupled to memory controller 202 via internal interconnect fabric 203. Memory controller 202 may be responsible for managing system memory access for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.). All devices coupled to internal interconnect fabric 203 may communicate with each other and with a host OS executed by CPU clusters 201A-N. In some cases, devices 209-211 may be coupled to internal interconnect fabric 203 via a secondary interconnect fabric (not shown). A secondary interconnect fabric may include any bus suitable for inter-device and/or inter-bus communications within an SoC.

A GPU 204 of the heterogenous computing platform 200 produces graphical or visual content and communicates that content to a monitor or display of the IHS 100 for rendering. In some embodiments, display engine 209 may be designed to perform additional video enhancement operations. In operation, display engine 209 may implement procedures for provide the output of GPU 204 as a video signal to one or more external displays coupled to IHS 100 (e.g., display device(s) 111). PCIe interfaces 205 provide an entry point into any additional devices external to heterogenous computing platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc. In operation, input and/or output audio streams may pass through and be processed by aDSP 206, which can send the processed audio to other devices on internal interconnect fabric 203 (e.g., CPU clusters 201A-N). In some embodiments, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.).

Camera device 210 includes an Image Signal Processor (ISP) configured to receive and process video frames captured by a camera coupled to heterogenous computing platform 200 (e.g., in the visible and/or infrared spectrum). Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

Sensor hub 207 may include AI capabilities designed to consolidate information received from other devices in heterogenous computing platform 200, process context and/or telemetry data streams, and provide that information to: (i) a host OS, (ii) other applications, and/or (iii) other devices in platform 200. In collecting data, sensor hub 207 may include General-Purpose Input/Output (GPIOs) that provide Inter-Integrated Circuit ($I^2C$), Improved $I^2C$ ($I^3C$), Serial Peripheral Interface (SPI), Enhanced SPI (eSPI), and/or serial interfaces to receive data from sensors (e.g., sensors 110, camera 210, peripherals 214, etc.). Sensor hub 207 may include a low-power core configured to execute small neural networks and specific applications, such as contextual awareness and other enhancements.

High-performance AI device 208 is a significantly more powerful processing device than sensor hub 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks. Using such capabilities, one or more devices of heterogeneous computing platform 200 (e.g., GPU 204, aDSP 206, sensor hub 207, high-performance AI device 208, VPU 211, etc.) may be configured to execute one or more AI model(s), simulation(s), and/or inference(s).

Security device 212 may include one or more specialized security components, such as a dedicated security processor, a Trusted Platform Module (TPM), a TRUSTZONE device, a PLUTON processor, or the like. In various implementations, security device 212 may be used to perform cryptography operations (e.g., generation of key pairs, validation of digital certificates, etc.) and/or it may serve as a hardware root-of-trust (RoT) for heterogenous computing platform 200 and/or IHS 100.

Modem/wireless controller 213 may be designed to enable wired and wireless communications in any suitable frequency band (e.g., BLUETOOTH or "BT," WiFi, CDMA, 5G, satellite, etc.), subject to AI-powered optimizations/customizations for improved speeds, reliability, and/or coverage. Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100.

In some implementations, EC 109 may be integrated into heterogenous computing platform 200 of IHS 100. In other implementations EC 109 may be external to the heterogenous computing platform 200 (i.e., the EC 109 residing in its own semiconductor package) but coupled to integrated bridge 216 via an interface (e.g., enhanced SPI or "eSPI"), thus supporting the EC's ability to access the SoC's internal interconnect fabric 203, including sensor hub 207 and sensor(s) 110. Through this connectivity supported by the interconnect fabric 203, EC 109 may directly access and/or operate most or all of devices 201-216, 110 of the heterogenous computing platform 200.

Figure 3:
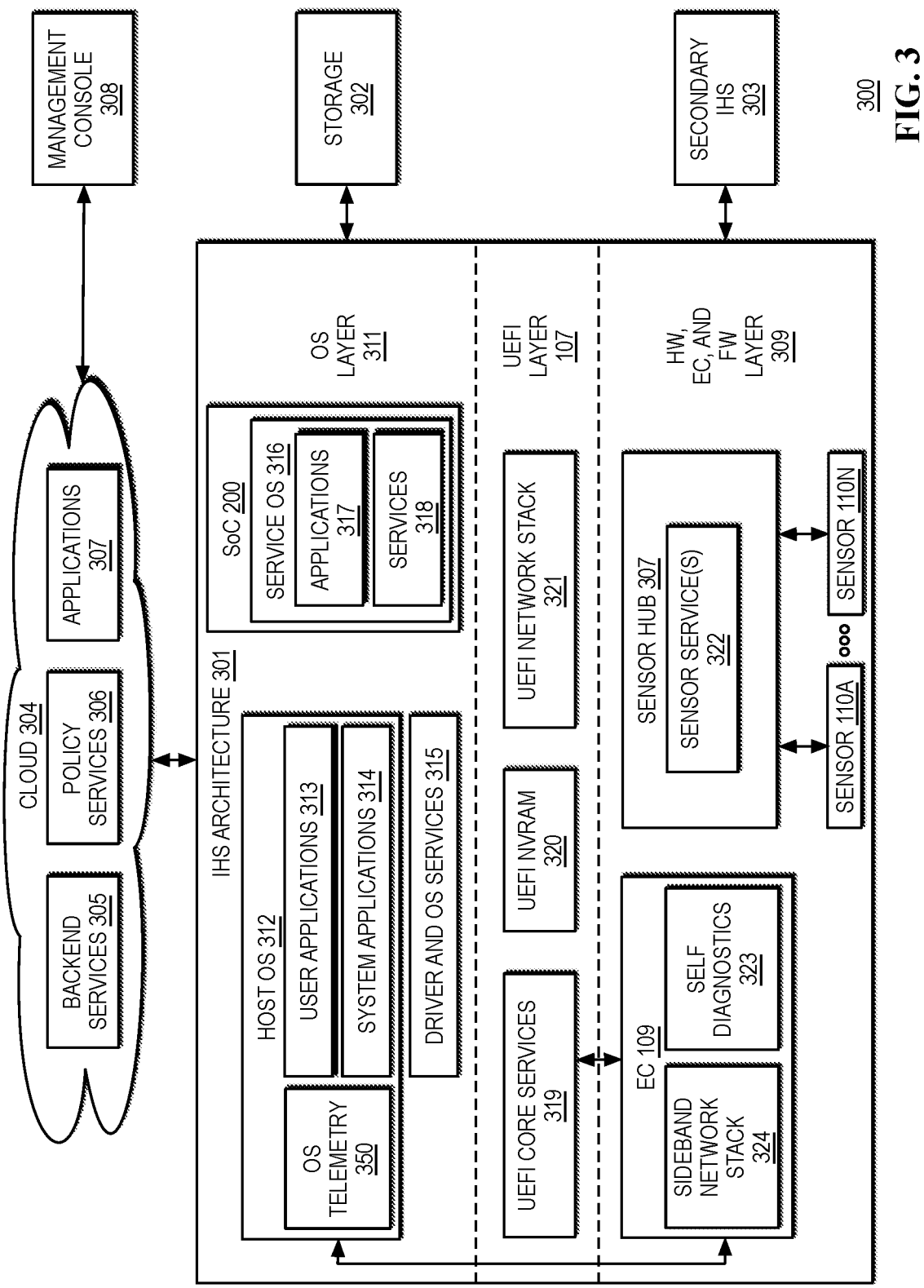
FIG. 3 is a diagram illustrating an example of a system, according to some embodiments, for diagnosing power state transition failures by an IHS.

FIG. 3 is a diagram illustrating an example of architecture 300 for diagnosing power state transition failures by an IHS 100. Particularly, architecture 300 includes IHS 301 (e.g., implementing aspects of IHS 100 and/or platform 200) coupled to storage device 302 (e.g., NVMe, SSD, etc.), secondary or companion IHS 303 (e.g., a smart phone, a laptop, etc.), and cloud or remote services 304. Cloud 304 may include backend or remote services 305, policy services 306, and web applications 307. In some cases, components of cloud 304 may be accessible to IHS 301 and/or secondary IHS 303, and configurable via ITDM management console 308.

IHS architecture 301 may include hardware/EC/firmware layer 309, BIOS layer 310, and OS layer 311. Specifically, OS layer 311 includes a host OS (Operating System) 312 that is executed by host processor(s) 101. A variety of software applications may operate within the OS 312, where these applications may include user applications 313 and system applications 314. As illustrated in FIG. 3, the applications that operate within the OS 312 may also include one or more telemetry applications 350. As described in additional detail below, host OS 312 may include software service 312a for use addressing the lack of firmware needed by individual hardware components in order to complete low power transitions, and thus allow the IHS itself to complete a supported low power transition.

OS layer 311 may also include various drivers and other core OS operations, such as the operation of a kernel. As described, various components of a heterogenous computing platform 200 may independently run their own operating systems, such as an OS run by an SoC. Within IHS architecture 301, some of these discrete operating systems operating on individual components of the heterogenous computing platform 200 may be considered service OSs 316, where each service OS may each include its own applications 317 and services 318. As described in additional detail below, hardware device drivers 315 used by host OS 312 and/or by service OSs 316 may support operation of hardware of the IHS 100. However, failure to release these drivers 315 or other hardware references may prevent transition of the IHS to a lower power operating state.

BIOS layer 310 may include pre-OS core services 319, pre-OS applications 320, and pre-OS network stack 321 that are each executed by BIOS 107. BIOS core services 319 may include operations for identifying and validating the detected hardware components of an IHS. BIOS applications 320 may include operations for interfacing with certain hardware devices of an IHS, in particular user input devices. The network stack 321 of BIOS 310 may be utilized during initialization of the IHS in support of validation procedures, such as in retrieving reference signatures corresponding to authentic firmware instructions for hardware components of an IHS 100.

As illustrated, IHS architecture 301 also includes a hardware/EC/firmware layer 309 that includes EC 109 and sensor hub 207. As described above, EC 109 may implement a variety of procedures for management of individual hardware of an IHS 100 and of the IHS itself, including management of the various power states that are supported by the IHS. EC 109 is configured to execute one or more sensor services 323 that interface with sensor hub 207 in implementing various features of an IHS 100, such response to user-presence determination by the sensor hub 207 that is acted upon by the EC 109 in initiation heightened security protocols. As described, EC 109 may interface with some or all of the individual hardware components/systems of an IHS via sideband management channels that are separate from inline communication channels used by the host processor 101 and SoCs.

As described above, sensor hub 207 may receive inputs from some or all of the sensors 110A-N of an IHS 100. Sensor hub 207 may implement a variety of sensor service(s) 322 for communicating with and collecting data from sensors 110A-N. In some embodiments, sensor hub 207 may implement shock detection procedures that ma incorporate inputs from inertial and other sensors 110A-N of an IHS. Such shock detection procedures may detect shocks experienced by an IHS 110 and may characterize and assess detected shocks in evaluating possible damage to the IHS.

Figure 4:
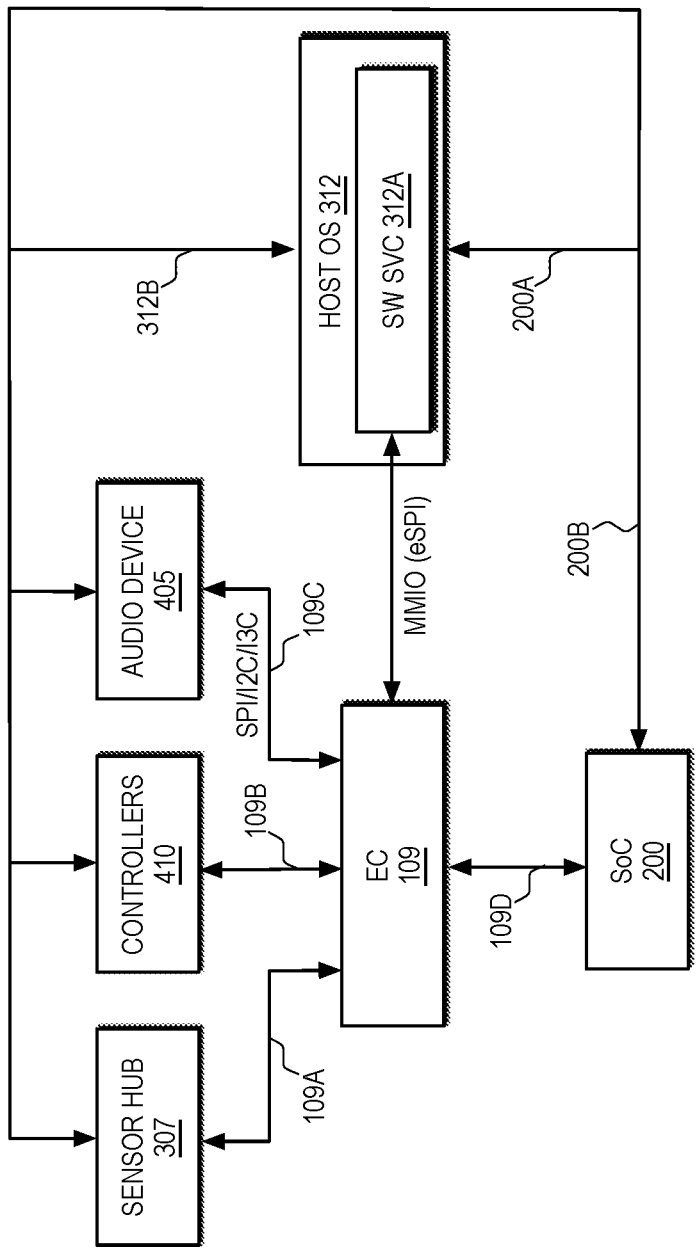
FIG. 4 is a diagram illustrating certain components of an IHS configured, according to some embodiments, for diagnosing power state transition failures.

FIG. 4 is a diagram illustrating certain components of an IHS 100 configured, according to some embodiments, for diagnosing power state transition failures by the IHS. A variety of applications operating on an IHS may interface with hardware of the IHS, such as in responding to inputs detected by these hardware components. For example, IHSs may include various capabilities that are implemented by a sensor hub 307. Sensor hub 307 may implement various operations that incorporate information from one or more sensors 110 of an IHS. For instances, user presence detection operations by sensor hub 307 may locate, and in some instances identify, individuals in close proximity to an IHS, such as based on camera inputs and inputs from time-of-flight type sensors 110.

As descried above, an SoC 200 may implement various procedures that utilize such sensor hub 307 determinations. For instance, SoC 200 may implement operations that evaluate a security risk posed by individual that have been detected by sensor hub 307 in close proximity to the IHS. In another example, in response to a determination by sensor hub 307 of a change in physical posture of an IHS, SoC 200 may initiate procedures for determining an updated security posture for the IHS and to implement screen blurring or other security protocols to account for the increased risk of onlookers when the IHS is configured in this particular physical posture. In such scenarios, SoC 200 may utilize a hardware device driver for interfacing with sensor hub 307, including receipt of notifications issued by sensor hub 307, such as a notification of a user detected in proximity to the IHS 100. The sensor hub driver process may stay running on the SoC 200 in order for the SoC to monitor for such notifications from sensor hub 307.

In this same manner, SoC 200 may utilize a hardware driver for interfacing with an audio device 405 of the IHS 100. For instance, SoC 200 may receive notifications of audio device 405 capturing voice audio. The SoC 200 may respond by evaluating the audio against reference voice-prints in order to authenticate a detected user based on voice data collected by audio device 405. SoC 200 may run an audio driver process that allows the SoC to interface with the audio device 405. SoC 200 may similarly respond to various other conditions that are reported by hardware controllers 410. For instance, SoC 200 may respond to notifications of network traffic detected by a network controller of the IHS 100 and may operate a network device driver in order to interface with the network controller. In another example, SoC 200 may respond to notifications of a touch controller.

In all such scenarios, SoC 200 may be configured to respond to inputs from hardware such as sensor hub 307, audio device 305 and hardware controllers 310 while SoC 200 is in a low power state. In some instances, SoC 200 operates a hardware driver in order to maintain an active session with a hardware component, with that hardware driver process listening for notifications of detected inputs that are utilized by the SoC, such as the described sensor determinations.

In this manner, SoC 200 may maintain various types of hardware refences, such as hardware drivers, memory addresses and bus connections, where SoC retaining these hardware references in their current state may prevent the SoC from transition to a low power operating state. In some instances, these hardware references may be maintained through direct connections 200b between the SoC 200 and the respective hardware component that is being referenced by the SoC. In some instances, these hardware references may be maintained through indirect connections 200a that are supported by the host OS 312, which interfaces directly 312b with the referenced hardware. Once the SoC has been directed to transition to a low power operating state, any failure to properly release or transition such hardware references, such as to terminate active drivers and/or to load low power drivers, may result in SoC 200 failing to transition to a low power state, thus preventing IHS from transitioning to a lower power operating state.

As described in additional detail below, in embodiments, EC 109 detects requests for power state transitions by the IHS, such as to transition the IHS to an S0ix modern standby mode, or any power mode that is lower in power consumption than the current operating state of the IHS, including transitioning the IHS to a fully off G3 state. For instance, EC 109 may detect a user input requesting a transition to a lower power state, such as via detection of graphical interface inputs to host OS 312 or such as a user input detected by EC 109 in the form of a button press or key sequence. Upon detecting a requested transition to a lower power operating state, EC 109 may initiate monitoring of the power state transitions of the individual hardware components of the IHS 100, such as based on sideband management connections 109a-d that supported by the EC 109 in providing remote management of the IHS and of certain managed hardware components of the IHS, such as sensor hub 307, audio device 305, hardware controllers 310 and SoC 200.

In particular, EC 109 monitors for SoC 200 transitioning to a low power operating state in response to the detected request. In some embodiments, EC 109 may monitor all ACPI communications issued by host OS 312 and ACPI responses issued by the SoC 200 and the other management hardware of the IHS. Once EC 109 has detected a failure by the IHS in transitioning to the requested low power operating state, EC 109 may utilize a sideband signaling pathway 109d that connects the EC 109 to the SoC 200. Though this sideband connection, operations of EC 109 may query SoC 200 in order to determine hardware resource references, such as hardware driver processes and memory address references, that are active and have not been released by the SoC. In additional, sideband management connections between EC 109 and managed hardware components, including an SoC, may be used to determine when the hardware component lacks firmware necessary to complete the low power transition, where software service 312a of the host OS may be utilized in identifying and loading firmware needed by a hardware component in order to support the low power transition. As described in additional detail below, EC 109 may identify the hardware component that is being referenced and may utilize sideband management connections 109a-c to interface with the referenced hardware directly in order to determine whether there is actually an ongoing session in support of the SoC, or whether the hardware reference may be released, thus allowing the SoC to transition to a low power operating mode.

Figure 5A:
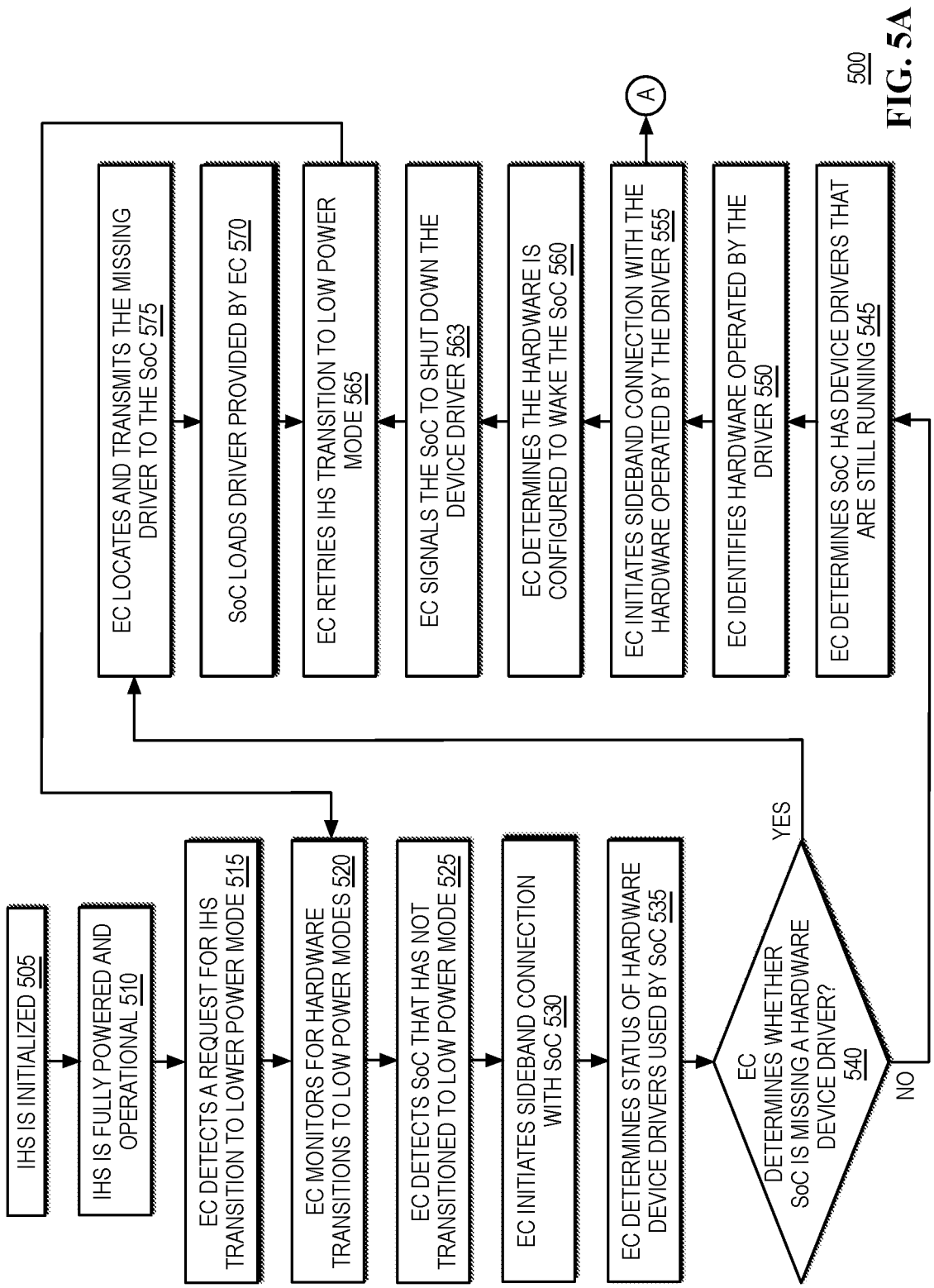
FIG. 5A is a diagram illustrating an example of a method, according to some embodiments, for diagnosing power state transition failures.
Figure 5B:
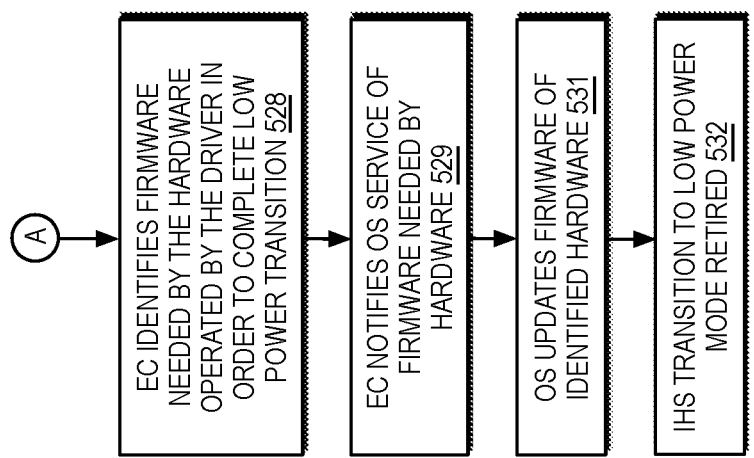
FIG. 5B is continuation of FIG. 5A.

FIGS. 5A and 5B are a diagram illustrating an example of a method, according to some embodiments, for diagnosing power state transition failures. Embodiments may thus begin, at 505, with the initialization of an IHS 100 that includes a heterogenous computing platform 200. Upon initialization, the IHS 100 may powered and validated as operating using trusted hardware and using authentic instructions. Initialization may include booting of one or more operating systems 312. In some embodiments, the host processor 101 may operate a host OS 312, where this host OS 312 may be operated by a user of the IHS 100 through various user inputs. In some embodiments, multiple other operating systems, such as one or more service OSs 316, may be operated by other processors or by SoCs of the heterogenous computing platform 200.

Once the host OS 312 has been booted, at 510, the IHS may operate in a S0 power state where the IHS if fully powered, but individual hardware components of the IHS that are idle may be individually placed in low power states. An IHS 100 may operate for any amount of time in fully powered modes. At 515, the EC 109 of the IHS detects a request for a transition of the IHS to a lower power mode. An IHS 100 may be transitioned from its current operating state to a lower power operating state in a variety of circumstances. Through transitioning to a lower power operating state, power consumption by the IHS is reduced, whether the power is being drawn from an external power source and/or from the internal rechargeable batteries of the IHS 100. For instance, an IHS 100 transitions to an S0ix modern-standby power state during which some or all of the hardware of the IHS are transitioned to low-power modes.

As described above, in some embodiments, an EC 109 may implement operations for transitioning an IHS 100 to the various supported power states. Accordingly, in some instances, the detected requests to transition an IHS 100 to a lower power state may be directed to EC 109 such as through ACPI (Advanced Configuration and Power Interface) requests that are issued by the host OS 312. In some instances, the EC 109 may detect a user input to a button or key sequence that signals a request to transition the IHS 100 to a specific low power state, where the request may be for a transition of the IHS 100 to an modern standby S0ix state, a fully off G3 state, or any other power state with a lower power consumption than the current operating state of the IHS.

Accordingly, in some embodiments, the request detected by the IHS may be an internal request to transition to a low power state, such as from a modern standby S0ix state to a fully off G3 state. For instance, in some embodiments, EC 109 may receive a request from BMU 112 via a sideband management channel to transition the IHS 100 to a lower power operating state due to the BMU detecting potentially damaging battery conditions, such as a low charge state. In such instances, without a rapid transition to the requested low power state, an abrupt shutdown of the IHS may be required, thus possibly resulting in loss of data and/or error states by hardware and software of the IHS.

Upon detecting a request to transition the IHS 100 to a lower power operating state, at 520, the EC 109 initiates procedures for monitoring the transition of individual hardware components of the IHS to low power states. Transitioning of an IHS 100 to a lower power operating state may initiate an ordered list of power state transitions of hardware components of the IHS that are to be transitioned individually to specific low power states. Each of these power state transitions by hardware components may be contingent on satisfying various conditions, such as ensuring that the hardware component is idle.

In some instances, this ordered list of procedures for transitioning an IHS 100 to a lower power operating state may begin with transitioning attached peripherals devices (e.g., external monitors, printers, projectors, attached USB devices, etc.) to lower power states. Once peripherals have been transitioned to low power operations, certain internal hardware of the IHS 100 may then be ready for transitioned to low power operations. For instance, hardware components such as storage drives 113, display controllers 104 and user inputs devices 106 may be transitioned to low power operations. If these hardware components are confirmed as being idle, they may be safely transited to low power operations.

Next, an IHS 100 may transition networking 105 and sensor 110 hardware to low power operating states. In some instances, these hardware components may remain partially powered after a transition to a lower power operating state by an IHS in order to receive and/or detect signals or other information that may trigger wakeup operations by the IHS, where the wakeup operations may resume fully powered S0 operations by the IHS, or may wake the IHS to an intermediate (e.g., S1, S2) state that allows the received information to be processed without fully waking the IHS.

Once all such hardware has been successfully transitioned to low power operations, an IHS may transition processors 101 and SoCs implemented by such processors to low power operations. However, as described above, inability to transition any of the hardware of the IHS 100 may prevent transition of processors 101 and SoCs to low power states, thus preventing the IHS from transitioning to a lower power operating state. In some embodiments, at 526, the EC 109 may detect the transition or failure to transition of each hardware component to a low power state based on monitoring of ACPI communications transmitted between the individual hardware components and the host OS 312. In some embodiments, EC 109 may utilize sideband management connections with individual hardware components in identifying when the component is not transitioning to a low power mode.

However, inventors have recognized that in many scenarios where an IHS 100 is prevented from transitioning to a lower power operating state, the hardware component preventing the transition is an SoC of the IHS. Accordingly, at 525, embodiments detect that an SoC has not transitioned to low power operations, such as by monitoring ACPI communications between the host OS 312 and the SoC, where the communications by the host OS request the SoC transition to a low power operations, but the SoC has not complied. The SoC may have partially transitioned to low power operations, but may be prevented from completing the transition due to inability by the SoC to release all software references to hardware components of the IHS. For instance, an SoC 200 may be unable to shut down a hardware device driver that is used by the SoC to interoperate an individual hardware component of the IHS, such as one of the described hardware device drivers used to detect inputs that are processed by the SoC.

Upon detecting an SoC 200 that is unable to complete the requested power state transition, at 530, EC 109 initiates a sideband communication session with the SoC. As described above, in some embodiments, an EC 109 may be directly coupled to an SoC 200 via a sideband management connection, such as an I2C bus connection, thus allowing direct communications between these two components. Via this sideband bus connection, at 535, the EC 109 may ascertain whether the SoC is still running software processes used for interfacing with IHS 100, such as ascertaining the status of hardware device drivers used by the SoC.

In some scenarios, an SoC may be prevented from completing a transition to a lower power operating state due to the lack of a required hardware device driver. In some scenarios, the SoC may have access to a device driver for a hardware component, but this driver may have been deprecated such that a new device driver is required for the SoC to support low power operations by the hardware component. In some scenarios, a required device driver may simply be missing. In some embodiments, operation of a hardware component in a supported low power mode requires loading a specialized device driver that operates with a limited resource footprint and is thus adapted to low power operations. If the SoC does not have the low-power device driver for a hardware component, the SoC may be unable to complete its own transition to low power operations since the existing device driver for that hardware component cannot be terminated and replaced with the replaced with the missing low-power device driver.

As indicated in FIGS. 5A and 5B, in scenarios where the SoC is without a required driver, at 575, EC 109 identifies the missing device driver, such as based on queries to cloud 304 services that specify the supported and required device drivers for operation of an individual hardware component by an IHS 100. Once the missing low-power driver for a hardware component is identified, the driver may be transmitted to the SoC, where, at 570, the driver may be loaded, thus enabling the SoC to support low power operations with the hardware component. For instance, while operating in a low power mode, an SoC may be configured to monitor wake signals issued by a hardware component that is also in a low power mode, such as a network controller that is listening for network communications while in low power mode and that may issue various wake signals upon detecting a particular command or condition.

After the SoC has received and loaded any missing device driver required for low power operations, the SoC may then be able to complete the transition to low power. Accordingly, at 565, the EC 109 retries the requested transition of the IHS to a lower power operating state. Some or all of the IHS procedures for the transition may be repeated and, at 520, EC 109 resumes monitoring of individual hardware component transitions to low-power operating states, such as based on monitoring of ACPI communications related to these components. In some instances, the IHS may be able to complete the low power transition based on the ability of the SoC to use the provided driver to complete its transition to low power operations. In other instances, embodiments may continue to operate in identifying additional hardware device drivers or other references that are retained by the SoC and that are still preventing the SoC from transitioning to a lower power operating state.

In scenarios where no hardware device driver is missing, at 545, EC 109 utilizes the sideband management connection 109*d* with the SoC 200 to determine whether device drivers are still being operated by the SoC. In some embodiments, EC 109 may query the SoC 200 to identify the software processes that are still being executed by the SoC, or at least the non-core processes that are running such as hardware device driver processes. In some embodiments, queries by the EC 109 may determine whether specific device driver processes are still running in the SoC, such as a device driver for a sensor hub 207 or network controller 105 that has been previously reported to cloud 304 analytics as preventing low power transitions. In some embodiments, the queries by the EC 109 may identify all non-core processes still operated by the SoC 200, with the EC relying on cloud-based tools 304 to determine which of these processes correspond to hardware device drivers or represent references to other IHS hardware resources, and, at 550, to identify the specify hardware devices that are operated by the device drivers that are still running on the SoC.

Once a hardware component has been identified that is operated by a device driver that is still running in the SoC, at 555, EC 109 may initiate a sideband management connection with that hardware component. As described above, EC 109 may support a variety of sideband signaling pathways 109*a*-*c* with individual managed hardware of an IHS 100. Through such signaling pathways, EC 109 may interface with a hardware component that corresponds to a hardware device driver that is running on the SoC. Queries to the hardware component may be used by EC 109 to establish whether the hardware component is actively communicating with the SoC. In some instances, remote management queries supported by the EC 109 in support of a remote management console 308 may establish whether the hardware component is idle, thus indicating there is no active session with the SoC 200.

As illustrated in FIG. 5A, the sideband queries to the hardware component may be used by EC 109 to establish whether the hardware component is operating with the firmware that is required for the component to transition to a low power mode. For instance, a storage drive coupled to the IHS may support low power operations of the IHS, but may require updated firmware by the storage drive, such as firmware adapted to respond to low power wake signals issued by the EC 109. At 529, the EC 109 notifies a host OS software service 312*a* or cloud service of the missing firmware of the hardware component that is preventing the low power transition by the SoC and/or IHS. In response, the host OS software service 312*a* may identify the firmware required for low power operations of the hardware component and updates the firmware of the component accordingly. In some embodiments, updates to the firmware of a hardware component may be delayed until efforts have been made to also identify hung device driver sessions of the SoC, such as described below. In such instances, the firmware update and the SoC device driver operations may be both completed before, at 532, the IHS transition to the low power mode is retried.

The remote management queries of the EC 109 may also establish whether the hardware component is supporting any active sessions, whether with the SoC 200 or with any other hardware of the IHS 100. For example, EC 109 may determine that the SoC 200 continues to run a hardware device driver for a storage controller of the IHS. Through the remote management queries supported by the EC 109, the active sessions being supported by the storage controller may be determined. In such a scenario, EC 109 may determine whether the storage controller is supporting any active sessions with the SoC, such as based on communications being transmitted by the storage controller via an interconnect 203 of a heterogenous computing platform 200 that is implemented by the SoC. In scenarios where the EC 109 detects an ongoing communication session with the SoC that is being supported by storage controller, the EC 109 may be configured to wait for predefined intervals and to continue evaluating the ongoing sessions by the storage controller in order to determine whether the session in support of the SoC has been completed.

After repeated attempts, EC 109 may determine that the session between the storage controller and the SoC is hung or otherwise nonresponsive. In such scenarios, EC 109 may initiate a series of queries to the storage controller and/or to the SoC in order to identify possible resource exhaustion or failure to release unused resources (e.g., system memory allocations, dedicated PCIe lanes, bus connections, etc.) by either of the components, thus indicating a hung process. In such instances, at 563, the EC 109 may direct the SoC to shut down the process of the driver corresponding to the non-responsive storage controller session. In some instances, the EC 109 may issue such commands to the SoC directly. In some instances, EC 109 may issue such termination commands via the host OS 312 or via a management operations supported by a host processor 101.

As in scenarios where EC 109 retrieves a missing driver that is needed to support a transition to a lower power operating state, at 565, EC 109 retries the requested transition of the IHS to a lower power operating state once the running driver(s) have been terminated. Some or all of the IHS procedures for the transition may be repeated and, at 520, EC 109 resumes monitoring of individual hardware component transitions to low-power operating states. In some embodiments, repeated inability to transition SoC 200 to a low power state due to nonresponsive driver processes may result in EC 109 initiating a restart of the SoC, or at least a reset of the communication interfaces supported by the SoC, and thus of all ongoing sessions being supported by the SoC.

In some instances, an SoC 200 may maintain an active hardware driver process in order to listen for wake signals from other hardware components. For instance, a sensor hub 207 of an SoC may implement procedures for initiating user authentication procedures as soon as the user is detected in proximity to the IHS, such as using voiceprint authentication to confirm the identity of a voice that is detected by a microphone of the IHS. In such scenarios, SoC 207 may operate an audio driver that listens for wake signals from a microphone of the IHS. In another illustrative example, the SoC may operate a network driver that listens for wake signals from a network controller of the IHS, in which case the SoC may wake to receive and respond to incoming network traffic.

As described, EC 109 may confirm that these components are not supporting active sessions with the SoC prior to initiating procedures to terminate a corresponding hardware device driver process by the SoC. In some embodiments, EC 109 may further query these hardware components to determine whether they are presently configured to wake the SoC if specific conditions and/or activities are detected by the component. As described above, in some instances, upgraded firmware may be required by the hardware component in order to support the SoC wake signal, thus also necessitating a firmware update to the hardware component, such as by a host OS 312 software service.

In evaluating the current configuration of a hardware component of the IHS such as a microphone, EC 109 may utilize its sideband management capabilities to query the I2C configurations of a microphone in order to determine whether the microphone firmware is a version that is configured to master the I2C bus and to transmit a signal to the SoC in the event of a wake condition. In scenarios where the microphone firmware is not able to wake the SoC, as described above, the needed firmware may be identified and loaded for use by the microphone. In scenarios where the microphone firmware is configured to wake the SoC, but there are no detected signs of ongoing activity between the microphone and the SoC, EC 109 may determine the audio driver operated by the SoC is in an error state that is preventing the transition to a lower power operating state. In some embodiments, EC 109 may initiate procedures for terminating the audio driver process by the SoC and/or restarting the SoC. In this same manner, EC 109 may identify and terminate hardware references maintained by SoC that correspond to wake notifications from hardware of the IHS 100.

In some embodiments, rather than terminate hardware references, such as active drivers or other processes of the SoC, the EC 109 may nonetheless identify the hardware component of the IHS that is in some manner preventing the SoC from transitioning to a low power state, such as an SoC unable to transition to a low power state due to lack of a needed low power driver necessary to maintain low power wake notifications from a network controller. In some embodiments, the EC 109 may direct such hardware components to terminate ongoing sessions with the SoC 109, thus stopping the SoC from delaying transitioning to a low power mode until the ongoing session with the hardware component can be transitioned to a session conducted using a low power driver that is not available. In some embodiments, the EC 109 may direct these components via the described sideband signaling channels. In some embodiments, EC 109 may terminate ongoing sessions by these components with the SoC through hardware register modifications that resets hardware communication interfaces used by these components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
an System on Chip (SoC);
an Embedded Controller (EC); and
a memory coupled to the EC, the memory comprising program instructions stored thereon that, upon execution by the EC, cause the EC to:
detect a request for the IHS to transition to a low-power operating state;
monitor progress of the IHS in transitioning to the low-power operating state;
determine the System on Chip (SoC) is preventing the transition by the IHS to the low-power operating state; and
identify and release hardware resources of the IHS referenced by the SoC in preventing the transition of the IHS to the low-power operating state.

2. The IHS of claim 1, wherein the low-power operating state of the IHS comprises a modern standby operating state.

3. The IHS of claim 1, wherein the request for the IHS to transition to a low-power operating state comprises a user input to the IHS that is detected by the EC.

4. The IHS of claim 3, wherein the user input to the IHS detected by the EC comprises an input to the operating system of the IHS.

5. The IHS of claim 3, wherein the user input to the IHS detected by the EC comprises a user pressing one or more buttons or keys of the IHS.

6. The IHS of claim 1, wherein to monitor the progress of the IHS in transitioning to the low-power operating state, the program instructions, upon execution by the EC, cause the EC to monitor the transition of a plurality of hardware components of the IHS to respective low-power operating states.

7. The IHS of claim 1, wherein the EC determines that the SoC is preventing the transition by the IHS to the low-power operating state based on the EC not detecting a transition of the SoC to a low-power operating state.

8. The IHS of claim 7, wherein, in response to the EC not detecting a transition of the SoC to a low-power operating state, the program instructions, upon execution by the EC, cause the EC to identify one or more hardware drivers being run by the SoC, wherein the running hardware drivers prevent the transition of the SoC to a low power operating state.

9. The IHS of claim 8, wherein the program instructions, upon execution by the EC, cause the EC to identify a hardware component of the IHS that is operated by the one or more running hardware drivers.

10. The IHS of claim 9, wherein the EC interfaces with the hardware component operated by the one or more running hardware drivers to identify active sessions with the SoC.

11. The IHS of claim 10, wherein the hardware resources of the IHS referenced by the SoC that prevent the transition of the IHS to the low-power operating state comprise the hardware component operated by the one or more running hardware drivers.

12. The IHS of claim 11, wherein the release of the hardware resources comprises the EC terminating the one or more hardware drivers run by the SoC.

13. A method for diagnosing power state transition failures by an Information Handling System (IHS), the method comprising:
detecting, by an Embedded Controller (EC) of the IHS, a request for the IHS to transition to a low-power operating state;
monitoring progress of the IHS in transitioning to the low-power operating state;
determining an System on Chip (SoC) of the IHS is preventing the transition by the IHS to the low-power operating state; and
identifying and releasing hardware resources of the IHS referenced by the SoC in preventing the transition of the IHS to the low-power operating state.

14. The method of claim 13, wherein the low-power operating state of the IHS comprises a modern standby operating state.

15. The method of claim 13, wherein the request for the IHS to transition to a low-power operating state comprises a user input to the IHS that is detected by the EC.

16. The method of claim 13, wherein the monitoring of progress of the IHS in transitioning to the low-power operating state comprises the EC monitoring the transition of a plurality of hardware components of the IHS to respective low-power operating states.

17. The method of claim 16, wherein the EC determines the SoC is preventing the transition by the IHS to the low-power operating state based on the monitoring of the EC not detecting a transition of the SoC to a low power operating state.

18. A non-transitory computer-readable storage medium having instructions stored thereon, wherein execution of the instructions by an Embedded Controller (EC) of an Information Handling System (IHS) causes the EC to:
detect a request for the IHS to transition to a low-power operating state;
monitor progress of the IHS in transitioning to the low-power operating state;
determine an System on Chip (SoC) of the IHS is preventing the transition by the IHS to the low-power operating state; and
identify and release hardware resources of the IHS referenced by the SoC in preventing the transition of the IHS to the low-power operating state.

19. The non-transitory computer-readable storage medium of claim 18, wherein the low-power operating state of the IHS comprises a modern standby operating state.

20. The non-transitory computer-readable storage medium of claim 18, wherein the request for the IHS to transition to a low-power operating state comprises a user input to the IHS that is detected by the EC.

* * * * *